April 28, 1970   W. M. BUSTIN   3,508,433
PIPELINE LEAK DETECTOR

Filed May 23, 1968   3 Sheets-Sheet 1

INVENTOR
WILLIAM M. BUSTIN
BY
Donald F. Wohlers
ATTORNEY

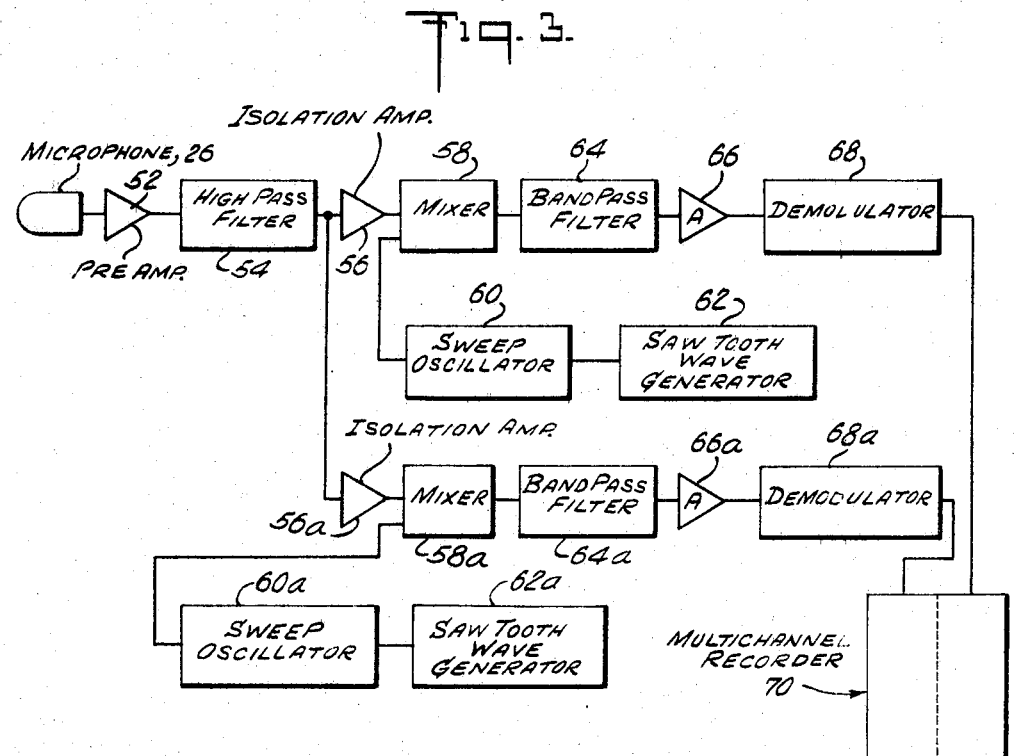
Fig. 3.
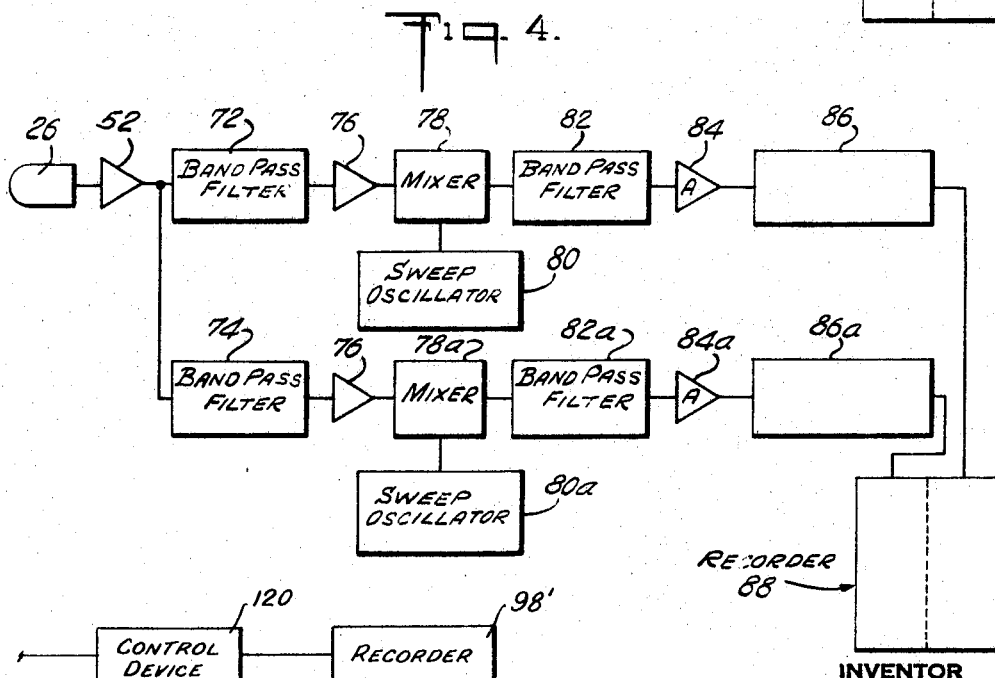
Fig. 4.
Fig. 5.

April 28, 1970   W. M. BUSTIN   3,508,433
PIPELINE LEAK DETECTOR
Filed May 23, 1968   3 Sheets-Sheet 3
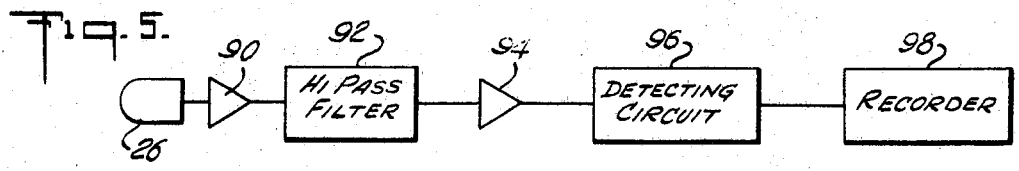
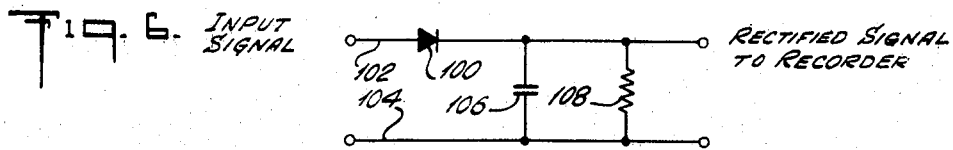
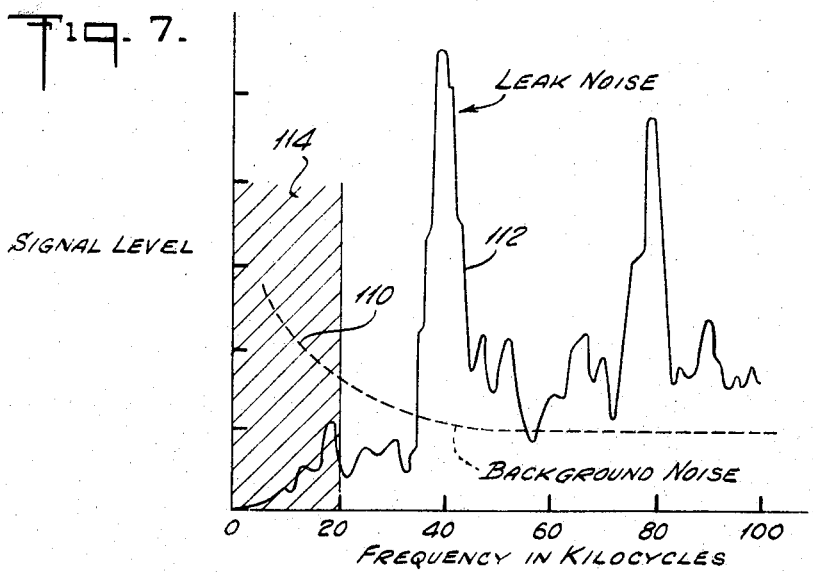
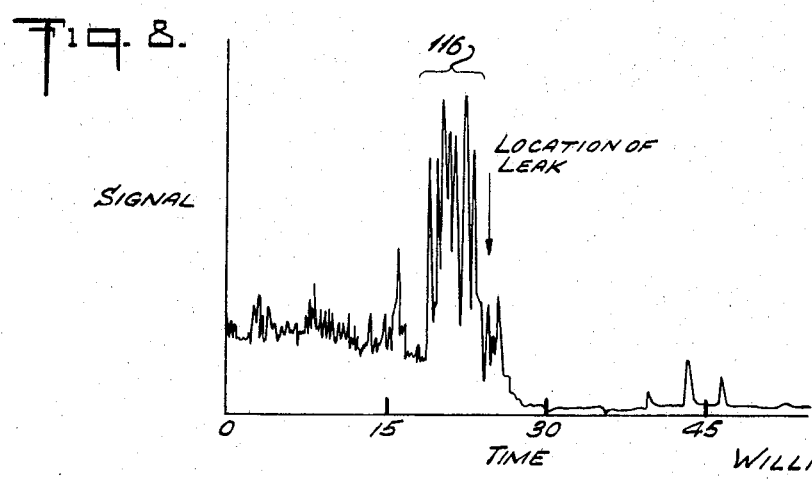
INVENTOR
WILLIAM M. BUSTIN
BY
ATTORNEY

United States Patent Office 3,508,433
Patented Apr. 28, 1970

3,508,433
PIPELINE LEAK DETECTOR
William M. Bustin, Summit, N.J., assignor to Esso Research Engineering Company, a corporation of Delaware
Continuation-in-part of application Ser. No. 513,695, Dec. 14, 1965. This application May 23, 1968, Ser. No. 740,801
Int. Cl. G01m 3/24
U.S. Cl. 73—40.5                              16 Claims

ABSTRACT OF THE DISCLOSURE

A pipeline leak detector using the ultrasonic characteristics of typical leaks eliminates background noise by filtering out the audio frequency noise. The ultrasonic spectrum of the leak is electrically demodulated to provide a DC signal proportional to the noise level rather than the noise itself. Means are provided for detecting predetermined ranges of the ultrasonic frequency spectrum and beating a variable frequency oscillator frequency thereagainst to produce a difference frequency in the audio range for subsequent demodulation. The leak detector is mounted on a plurality of roller supports and includes sound insulation means isolating the microphone from the remainder of the detector.

---

This application is a continuation-in-part of applicant's prior application Ser. No. 513,695, filed Dec. 14, 1965, now abandoned.

This invention relates to leak detection devices in general and in particular to improvements in pipeline leak detectors of the type wherein an instrumented pig travels along the interior of a pipeline to survey and record the noise conditions therein and uses this information as an indication of the presence of leaks and their location in the pipeline.

It is known that leaks in a pipeline may be determined to exist by sending noise responsive instruments through a pipeline and making a continuous record of the sound detected as the recording instrument passes therethrough. Instruments of this general type have been the subject of numerous patent applications. A principal difficulty with previously developed pipeline leak detectors operating on an acoustical principle resided in the fact that they usually recorded all of the noise generated in the pipeline, including the background noise as well as the noise of the fluid escaping from the leak. This presented a problem of discrimination between one portion of the recorded noise constituting the background noise in the pipeline, and that noise which was attributable to the presence of the leak. A further additional problem also present in the prior art, 100% noise recording systems is that the sensed noise itself was recorded. Obviously, to directly record the entire sensed noise spectrum requires the use of bulky, sophisticated noise recording instruments having a sufficiently broad frequency response so that all frequencies of the noise, both background and leak, are measured. Prior art systems of this type have been unsatisfactory, unduly complex and expensive, and have not been put into widespread commercial use in view of the extreme difficulty of discriminating between which of the recorded noises constituted the actual noise of the pipeline leak and which of the recorded noises were normal background noises.

In the present invention, the deficiencies outlined above encountered with prior art leak detection devices operating on an acoustical noise principle are avoided and a noise detection device of greatly improved accuracy, reliability and reduced cost is possible. In the development of the present invention, it was found that the background noise in the pipeline in the audio frequency range was loud enough to drown out the leak noise in many instances, thereby making the discrimination of the presence or absence of a leak extremely difficult with devices operating on the aforementioned prior art principles. However, in accordance with the invention it was found that in the ultrasonic range (above 10 or 20 kc.), the magnitude of the background noise was substantially less in relationship to the magnitude of the leak noise. Accordingly, the present invention is concerned with a leak detection system which filters out the background noise in the audio range along with the audio range component of any leak noise and looks only at the ultrasonic noise within the pipeline. The present invention utilizes the discovery that substantially all leaks in pipelines, and particularly those of a small character which are the ones that are most difficult to find in actual practice, have a significant portion of their overall noise in the ultrasonic spectrum and that the typical ultrasonic noise spectrum has one or more peak amplitudes at various ultrasonic frequencies. Complementing this appreciation that a significant proportion of the total leak noise is in the ultrasonic range, is the discovery that a much smaller percentage of the total background noise is in the ultrasonic range. Accordingly, in the ultrasonic frequency range a substantially increased noise differential exists between these two contrasting noise spectrums and a more desirable regime for leak detection is available.

Another important aspect of applicant's invention is the specific manner in which the sensed ultrasonic frequency signals are electronically processed and recorded. In prior art acoustical leak detection systems, not only was it generally customary to record the presence of all background noises as well as leak noises, but it also was characteristic that these noises were recorded at their generated frequencies. In applicant's arrangement, to avoid the obvious complexity of any recording device of sufficient band-width to record the presence of an ultrasonic noise frequency in the range of 20 to 100 kc. per second, a novel detection system is employed wherein the noise level rather than the noise itself is recorded. This procedure eliminates the need for wide band recording equipment. In a simplified form of the invention, the ultrasonic sound signal is rectified or demodulated to produce a unidirectional voltage proportional to the sound intensity. In another form of the invention, one or more portions of the ultrasonic noise spectrum is repeatedly swept and the amplitude of the loudest signal encountered in the spectrum is recorded. In this manner, the recording device need only have a frequency response recording capability equal to the rate at which the noise level varies.

The present invention overcomes a significant defect in prior art devices in that the magnitude of the background noise created by the normally employed scraper cups on the pig is completely avoided by support of the instrument package on a plurality of spring biased rollers. This roller support arrangement reduces the normally loud level of background noise due to the sliding of the scraper cups along the inside wall of the pipe which may be of rough or smooth surface condition.

In order to locate the leaks detected by the pig it is necessary that the location of the pig be recorded during its travel through the pipe. While many methods are known in the art, one of the more appropriate is to utilize one of the wheels to drive an odometer. This can be accomplished by attaching a small magnet to one of the wheels and recording voltage pulses induced in an electromagnetic pickup mounted on the wheel support. As a refinement, the voltage pulses may be summed in a counting circuit and the sum recorded in digital or analog form.

Accordingly, it is a principal object of the present invention to provide an improved apparatus for detecting and locating leaks in a pipeline.

Another object of the invention is to provide an improved apparatus for making an acoustical survey of the ultrasonic noise within a pipeline.

Another object of the invention is to provide an improved pipeline survey pig having extremely low background noise.

Another object of the invention is to provide an improved apparatus operating on the ultrasonic noise principle for surveying a pipeline for leaks.

Another object of the invention is to provide an improved frequency analysis and recording means wherein the presence of an ultrasonic noise frequency within a preselected band-width is recorded at a frequency far below the actual ultrasonic noise frequency.

Another object of the present invention is to provide an improved pipeline survey device wherein the peak value of the loudest ultrasonic frequency component is recorded.

Another object of the invention is to provide a novel noise sensing and frequency discriminating circuit wherein a preselected band-width of ultrasonic frequencies is swept and only the magnitude level of the loudest frequency component in the band-width is recorded.

These and other objects and advantages of the invention will become apparent and the invention will be fully understood from the following description and drawings in which:

FIGURE 3 is a schematic diagram of one form of noise sensing and recording circuit;

FIGURE 4 is a schematic diagram similar to FIGURE 3 showing an alternate form of noise sensing and recording circuit;

FIGURE 5 is an alternate and more simplified noise recording circuit;

FIGURE 6 is an electrical diagram of one form of demodulator employed in the circuit of FIGURES 3, 4 and 5;

FIGURE 7 is a graph showing the frequency range and magnitude of a typical leak noise spectrum in comparison with the background noise level over the same frequency range; and FIGURE 8 is a graph showing a typical recorder trace indicating the passage of the leak detector past a leak in a pipeline.

FIGURE 9 shows a modified form of recorder input control.

Figure 1:
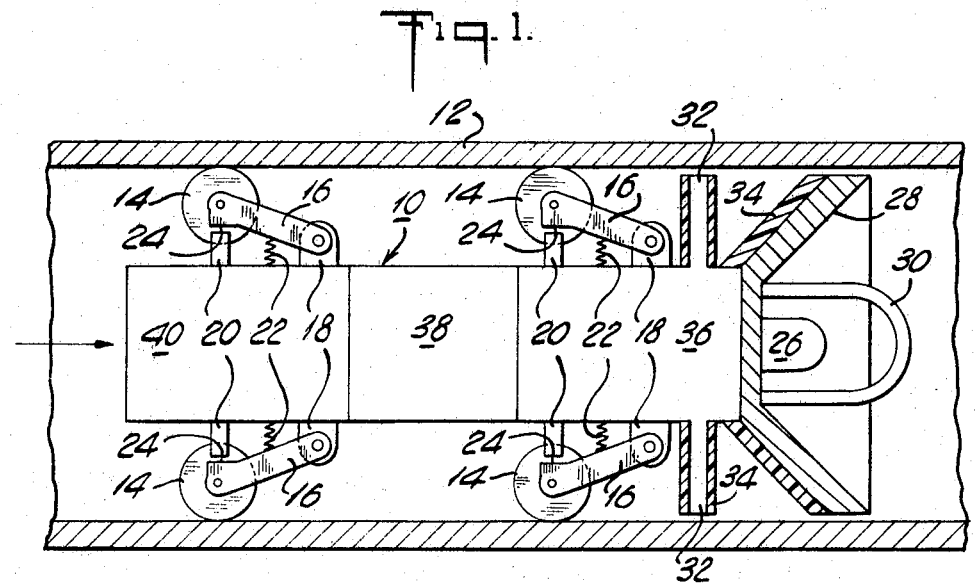
FIGURE 1 is a side elevation view of a leak detector in accordance with the invention showing portions thereof in cross-section.

Referring to the drawings in particular, a leak detection device or pig generally indicated at 10 is centrally supported by a plurality of roller means 14 within a typical device or pig generally indicated at 10 is centrally supported by a plurality of roller means 14 within a typical pipeline conduit 12. Each of the rollers 14 is pivotally supported at one end of arms 16 which arms are in turn pivotally supported at their other end by a mounting boss 18 projecting outwardly from the body of the leak detector 10. It will be understood that a plurality of rollers 14, preferably 3 or more, are employed about the periphery of the leak detector so that it is held in a centralized condition within the pipeline. Each of the arms 16 is biased outwardly by a compression spring 22 to maintain each of the rollers 14 in surface rolling contact with the interior diameter of the pipeline. Inward movement of the rollers 14 is limited by a stop means 20, the outer end of which is arranged to contact a flat boss portion 24 of the arm 16. A microphone 26 is secured at one end of the body portion of the leak detector 10. While in a typical application in a pipeline such as one carrying liquid hydrocarbons, the microphone device is preferably of a hydrophone variety, those skilled in the art will readily appreciate that applicant's invention is equally applicable to pipelines carrying gases wherein leaks in the conduit would also have a corresponding frequency characteristic capable of measurement and detection in a manner similar to that described herein. Accordingly, this invention contemplates the use of any type of acoustical pickup device such as a microphone or hydrophone. A conical baffle member 28 surrounds the microphone 26 and projects forwardly thereof to provide a shielding function and to make the microphone 26 directionally responsive to noises emanating from the pipeline to the right of the microphone. A microphone guard 30 of U-shaped configuration projects forwardly of the microphone 26 to protect it from damage should the leak detection device inadvertently come into physical contact with a portion of the pipe wall or other internal obstructions.

On the rear surfaces of the conical baffle 28 a sound deadening and insulation material 34 is provided. A similar layer of sound insulation material 34 is also provided an opposite sides of an annular disc shaped baffle 32 projecting outwardly from the leak detector adjacent to the conical baffle 28. Each of the baffles 28 and 32, in combination with their associated sound deadening layers 34, operate to create a highly directional characteristic to the microphone so that it will only hear the noise frequencies in the pipeline in one direction from leak detectng device and be effectively isolated from all of the noises, either background or leak noises, originating on the other side of the leak detector. In this way, a very sharp and pronounced drop-off in leak noise will be obtained as the leak detection pig passes the point of leak location in the pipeline. The sharp drop-off in leak noise accomplished by the use of the baffle and insulation arrangement will be more readily apparent in connection with the later description of FIGURE 8.

The central body portion of the leak detector which is only shown schematically includes an electrical circuit module portion 36, a battery power supply portion 38 and a one or more channel magnetic tape recorder portion 40. Those skilled in the art will readily appreciate that suitable mechanical structure is provided (not shown) interconnecting these various body portions and enclosing all of the electrical equipment in sealed relationship and isolated from the pressurized pipeline fluid.

Figure 2:
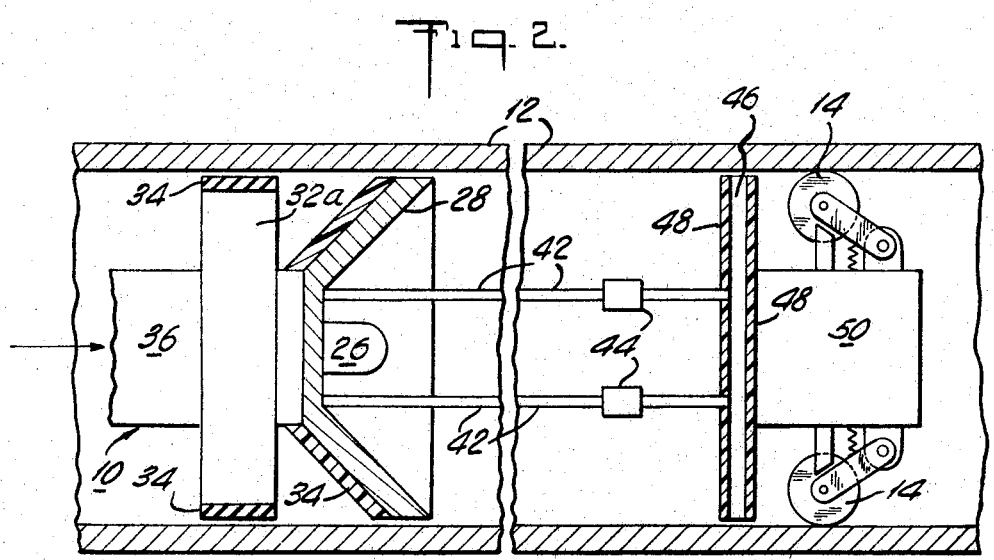
FIGURE 2 is a view similar to FIGURE 1 showing a second embodiment of the leak detector.

Referring to FIGURE 2, a modified arrangement of the leak detector of FIGURE 1 is shown. In FIGURE 2, elements having similar function and structure have been identified with similar reference numerals and will not be described again. However, in the arrangement of FIGURE 2, the leak detection device indicated at 10 includes a microphone 26 and conical baffle 28 as before. The baffle 28 is provided with an acoustical insulation material 34 while adjacent thereto an extending annular ring 32a is employed for additional sound isolation purposes. The sound isolation ring 32a includes an outer circumferential band of insulation material 34 which is spaced closely adjacent the interior wall of the pipe and in combination therewith effectively isolates the microphone 26 from acoustical energy in the pipeline coming from the left of the pig. Forwardly of the microphone 28, in the direction of travel of the pig, a plurality of extending rods 42 are connected through flexible couplings 44 to a plate or disc member 46. A sound deadening layer 48 of suitable material is applied to the front and rear surface of the plate 46 which in turn is connected to a body member 50 supported centrally within the pipeline by a plurality of roller means 14. The couplings 44 are preferably made of some resilient material so that vibrations of the member 50 in its roller means 14 are not transmitted back to the baffle 28. Additionally, coupling 44 permits the elongated leak detector of FIGURE 2 to navigate curved sections of the pipeline 12 where it might otherwise interfere with the pipe walls.

With the arrangement shown in FIGURE 2, it will be seen that the leading disc 46 and noise insulation means 48 are effective to limit the forward looking range of the microphone 26. In effect, a smaller forward looking window is thereby produced for the microphone. The insulation means rearward of the microphone 26, namely the cone 28, the further insulation disc 32a and the sound absorbing material 34, is effective to isolate the leak noise from the microphone 26 after the pig and microphone have traveled with the pipeline fluid past the point where the leak is located thereby accomplishes a sharp drop-off in leak noise signal received.

Referring to FIGURES 3, 4 and 5, various forms of electrical circuit arrangement are shown which may be employed to advantageously process the signal received by the microphone 26.

Referring specifically to FIGURE 3, the output signal from the microphone 26 is connected through a preamplifier 52 to a high pass filter 54. The high pass filter 54 blocks essentially all of the noise frequencies in the audio range of below 10 or preferably 20 kc. The ultrasonic frequencies above 10 or 20 kc. are channeled to a pair of isolation amplifiers 56 and 56a operating in parallel. The output from amplifier 56 is connected to a mixer circuit 58 where it is combined with the output of a sweep oscillator 60 controlled by a saw tooth wave generator 62 to produce sum and difference frequencies which are in turn fed through a band pass filter 64 to a further amplifier 66. The output from the amplifier 66 is connected to a demodulator 68 or peak reading circuit whose output is in turn connected to one input channel of a multi-channel recorder 70.

In operation of this portion of the circuit, frequencies in the range of 5 to 6 kc. are passed through the band pass filter 64, amplified by amplifier 66 and fed into the peak reading detector or demodulator 68. Thus, if for instance the oscillator 60 has an output at any one instant at 90 kc., any incoming signals between 84 and 85 kc. or between 95 and 96 kc. will produce sum and difference frequencies of 5 to 6 kc. at the output of mixer 58 which will carry through the band pass filter 64 to the detector 68. The detector is preferably a demodulator circuit similar to FIGURE 6 and is effective to produce at its output a unidirectional voltage proportion to the loudest frequency component in the frequency band swept.

The oscillator 60 is not operated at a constant frequency, but is swept repeatedly across a 10 kc. range by a varying voltage output from the saw tooth wave generator 62. As a result, a 20 kc. wide band of the incoming noise signal is continuously monitored. Thus, if the oscillator sweeps from 90 to 100 kc., the leak noise in a frequency range of from 85 to 105 kc. is being detected and recorded by this portion of the circuit. The saw tooth wave generator sweep frequency is selected to be approximately 30 cycles per second which is the practical maximum sweep rate permitted by the transient response of the band pass filter 64.

The lower portion of the circuit of FIGURE 3 contains a similar noise analyzing and recording network including an isolation amplifier 56a, mixer 58a, band pass filter 64a, amplifier 66a, demodulator 68a, sweep oscillator 60a, and saw tooth wave generator 62a all of which perform in a similar manner to the corresponding components described above. The only way in which the second leg differs from the first is in the output frequency range of the sweep oscillator. As before, the oscillator's output frequency is constantly swept across a 10 kc. range by the voltage from the saw tooth generator 62a. If it is desired in the second channel to look at the leak noise spectrum in the frequency range of 65 to 85 kc., the output of the sweep oscillator 60a would be varied between 70 and 80 kc. The detecting circuit would then produce a DC output proportion to the loudest frequency component in the frequency band of 65 to 85 kc. which would be recorded as before, with respect to time on the second channel of the recorder 70.

Referring to FIGURE 4, a circuit detecting and recording system similar to that of FIGURE 3 is shown. In FIGURE 4, the principal difference resides in that the output signal from the microphone 26 after being amplified by the preamplifier 52 is fed in parallel to the input or one or more specific band pass filters 72 and 74. In the example shown, band pass filter 72 passes frequencies in the range of 80 to 100 kc. while the adjacent filter 74 passes an adjacent frequency range 60 to 80 kc. Those skilled in the art will readily appreciate that additional filters selective to various frequency ranges may also be employed in parallel with filters 72 and 74 for other selected frequency ranges. In the upper path of the network in FIGURE 4, the noise in the frequency range of 80 to 100 kc. coming through filter 72 is amplified by amplifier 76 and combined in a mixer 78 with the output of a sweep oscillator 80. The oscillator 80 output frequency varies between 85 and 95 kc. so that sum and difference frequencies are passed to a band pass filter 82, amplifier 84, detecting circuit 86 and thence to the first channel of a multi-channel recorder designated 88. The lower half of the circuit operates in a similar fashion and employs similar operating components designated 78a, 80a, 82a, 84a and 86a to feed the second channel of the multi-channel recorder 88. In the lower portion of the circuit of FIGURE 4 the band pass filter 74 permits passage of frequencies in the range of 60 to 80 kc. therethrough while the sweep oscillator 80a has an output varying frequency of between 65 and 75 kc. so that the associated channel of the recorder will record a frequency component existing in the range of 60 to 80 kc.

In FIGURE 5, a highly simplified further embodiment of a detecting and processing arrangement is disclosed. In FIGURE 5, the output of the microphone 26 is amplified by preamplifier 90 and thence fed to a high pass filter 92. The filter 92 permits the passage therethrough of all frequencies in the ultrasonic frequency range exceeding 20 kc. An amplifier 94 amplifies the ultrasonic frequency which is in turn processed by the detecting circuit 96 and fed to a recorder 98. In the arrangement of FIGURE 5, the ultrasonic frequency spectrum is not broken down as before and individually analyzed, but rather the entire ultrasonic noise is fed to a single peak reading circuit.

In FIGURE 6, an example of one form of detecting circuit is shown wherein the signal on leads 102 and 104 is rectified by a diode 100 and fed to a capacitor 106. A resistor 108 is connected in parallel across the capacitor to discharge it at a rate substantially slower than the rate at which it is charged by the constantly varying unidirectional input voltages across the capacitor 106. In this way because the input to each channel of the recorder is always in the form of a relatively slowly varying unidirectional voltage rather than an AC voltage of the frequency of the leak noise, a rather simplified and low cost recording means may be employed.

In other words, in operation the capacitor 106 is charged to the highest voltage occurring during a sweep of a selected band-width by an associated oscillator and mixer such as oscillator 60 and mixer 58. The charging rate of the capacitor 106 is much faster than the sweep rate, while the discharge rate is much slower. Consequently, the voltage on this capacitor is proportional to the peak value of the loudest frequency component encountered in any one sweep cycle. Accordingly, the signal fed to the associated channel of the recorder is in effect a relatively slowly fluctuating unidirectional voltage, the level of which may be seen in FIGURE 8 which is a representative trace of a leak detection survey run through a pipeline.

In FIGURES 7 and 8, a pair of representative graphs may be seen. In FIGURE 7, broken line 110 is representative of the background noise level as a function of frequency in kilocycles. As will be seen from the decreasing slope of the line 110, most of the background noise is in a frequency range below 20,000 cycles per second or mainly within the audio range. In contrast to the background noise frequency spectrum, line 112 is representative of the sound level of a typical pipeline leak frequency spectrum. It will be seen from an inspection of the leak curve 112 that most of its loudest frequency components are in the ultrasonic range above 20 kc. and that a series of rather intense volume peaks are present in the ultrasonic region where the background noise is relatively low. Accordingly, applicant's novel exclusive use of the ultrasonic noise frequencies produces a device which is highly sensitive to leak noises and also able to discriminate the characteristic leak noise frequencies from background noise level. The shaded area designated 114 below 20 kc. represents the portion of the noise spectrum that is discarded by the detecting circuit such as filter 54 in FIGURE 3.

Referring to FIGURE 8, a typical plot of an actual leak detection run is shown wherein the magnitude of the loudest frequency component in a predetermined frequency band-width has been plotted with respect to time. In FIGURE 8, the latter portion of the curve after the first 30 time units represents the normal variation in background noise level within the pipeline. As the pipeline leak detection device travels down the pipeline, approaching the leak, an increase in the noise level is sensed by the microphone 26 and indicated on the recording trace by the high peaks in the area designated 116. After the detection pig has progressed past the point of leak in the pipeline, a very sharp drop-off in noise results and may be readily interpreted by inspection of the graph. The location of the leak is indicated at point 118 occurring approximately 22 time units after the start of the leak run.

Referring to FIGURE 9, a modified form of recorder input circuit is shown including a control device 120. The input to device 120 may originate from a detecting circuit such as 96 in FIGURE 5 or the demodulators 68 or 86 of FIGURES 3 and 4, respectively. The control device 120 includes conventional circuit and switch means responsive thereto which function to activate and supply the input signal to the recorder 98' only when the device determines on the basis of amplitude and or duration that an input signal approaching the characteristics of typical leak noises are present. By thus recording only during the time that substantial and suspicious noises are present, the recorder capacity can be appreciably extended to permit inspection runs of longer length or duration.

Thus, it will be seen how the applicant's novel combination of elements has produced an improved leak detection device having greater leak discrimination and sensitivity, that is not only reliable but also economical in construction.

While several specific embodiments of the invention have been shown and described in detail to illustrate the application of the inventive principles, it will be understood that the invention may be embodied otherwise without departing from such principles.

What is claimed is:

1. Apparatus for detecting leaks in a pipeline conveying a moving fluid under pressure comprising, in combination, a body member having the roller means attached thereto engaging the interior walls of the pipeline and spacing said body member from said interior walls and constituting substantially the sole contact between said body member and interior walls, a microphone having an output mounted at one end of said body member for sensing the noise in the pipeline in one direction from said body member; and noise analysis means associated with said body member connected to the output of said microphone, said analysis means including filter means connected to the output of said microphone, said filter means allowing the transmission therethrough of ultrasonic noise frequencies and blocking the passage of substantially all the pipeline background and leak noise in the audio frequency range, means responsive to the ultrasonic noise frequencies for producing a unidirectional electrical signal proportional to the amplitude of the ultrasonic noise level and means for permanently recording the level of said electrical signal.

2. Apparatus for detecting leaks in a pipeline conveying a moving fluid under pressure comprising, in combination, a body member having roller means attached thereto engaging the interior walls of the pipeline and spacing said body member from said interior walls and constituting substantially the sole contact between the body member and interior walls, a microphone having an output mounted at one end of said body member for sensing the noise in the pipeline in one direction from said body member; and noise analysis means associated with said body member connected to the output of said microphone, said analysis means including filter means connected to the output of said microphone, said filter means allowing the transmission therethrough of ultrasonic noise frequencies and blocking the passage of substantially all the pipeline background and leak noise in the audio frequency range, means responsive to the ultrasonic noise frequencies for producing a unidirectional electrical signal proportional to the ultrasonic noise level in a predetermined ultrasonic frequency range, and means for recording the said unidirectional electrical signal.

3. Apparatus in accordance with claim 2 including noise insulation means between the microphone and said body member for shielding the noise originating in the pipeline in the other direction from said microphone.

4. Apparatus according to claim 3 wherein said noise insulation means includes further insulation means located between said microphone and said roller means.

5. Apparatus according to claim 2 wherein said means responsive to the ultrasonic noise frequencies include means for sweeping the ultrasonic frequencies.

6. Apparatus according to claim 5 wherein said means responsive to the ultrasonic noise frequencies further includes at least two ultrasonic frequency responsive channels each having adjacent frequency ranges connected in parallel to the output of said filter means.

7. Apparatus in accordance with claim 1 wherein said noise analysis means further includes at least two ultrasonic band pass filters each having adjacent band pass frequency ranges connected in parallel to the output of said filter means, and a plurality of noise responsive means each connected to the output of an associated band pass filter for producing a unidirectional electrical signal proportional to the peak value of the loudest frequency component in the output of each of said band pass filters.

8. Apparatus according to claim 7 wherein each of said noise responsive means includes means for sweeping the frequency band of its associated band pass filter.

9. Apparatus according to claim 6 wherein said recording means includes means associated with each of said channels for continuously recording the said signal produced proportional to the peak value of the loudest frequency component in the output of each of said channels.

10. Apparatus in accordance with claim 3 including rod means projecting from the microphone end of said body member axially along the length of said pipeline, and auxiliary body means connected to said rod means, said auxiliary body means including sound insulation means for limiting the forward sensitivity range of said microphone.

11. Apparatus in accordance with claim 10 wherein said rod means includes flexible coupling means for permitting longitudinal deflection thereof, and wherein said auxiliary body member includes roller support means for engaging the interior diameter for said pipeline.

12. Apparatus in accordance with claim 3 including guard means projecting forwardly of said microphone for protecting said microphone from physical damage.

13. A method for detecting leaks in a pipeline conveying a moving fluid under pressure, comprising the steps of, introducing a vibration sensing transducer into the pipeline to move with the fluid passing therethrough past any leaks that may exist in said pipeline to sense the ultrasonic vibrations of said leak and generate an AC electrical signal corresponding thereto, mixing the AC electrical signal with a varying frequency oscillation signal to produce a difference frequency, demodulating said difference frequency to produce a varying unidirectional voltage proportional to the amplitude of the ultrasonic noise level, and recording the varying unidirectional voltage as said transducer moves with said fluid in said pipeline to thereby make a permanent record with respect to time of the ultrasonic noise envelope rather than the actual noise at its generated frequency.

14. A method for detecting leaks in a pipeline conveying a moving fluid under pressure, comprising the steps of, introducing a vibration sensing transducer into the pipeline to move with the fluid passing therethrough past any leaks that may exist in said pipeline to sense the ultrasonic vibrations of said leak and generate an AC electrical signal corresponding thereto, passing said signal through a band pass filter to select a desired predetermined range of said ultrasonic vibration, mixing said predetermined ultrasonic frequency range with an electrical oscillation signal which is varied over a predetermined range of frequency to produce a difference frequency, demodulating said electrical signal in said audio frequency range to produce a varying unidirectional voltage proportional to the amplitude of the ultrasonic noise level in said predetermined ultrasonic frequency range, and recording the varying unidirectional voltage as said transducer moves with said fluid in said pipeline to thereby make a permanent record with respect to time of the ultrasonic noise level rather than the actual noise at the frequency at which it originated.

15. Apparatus for detecting leaks in a pipeline conveying a moving fluid under pressure comprising, in combination, a body member having roller means attached thereto engaging the interior walls of the pipeline and spacing said body member from said interior walls and constituting substantially the sole contact between said body member and interior walls, a microphone having an output mounted at one end of said body member for sensing the noise in the pipeline in one direction from said body member; and noise analysis means associated with said body member connected to the output of said microphone, said analysis means including filter means connected to the output of said microphone, said filter means allowing the transmission therethrough of ultrasonic noise frequencies and blocking the passage of substantially all the pipeline background and leak noise in the audio frequency range, means responsive to the ultrasonic noise frequencies for producing a unidirectional electrical signal proportional to the amplitude of the ultrasonic noise level, and means responsive to said electrical signal for activating a recording means whenever the leak noise exceeds a predetermined level.

16. Apparatus in accordance with claim 15 including recording means for recording said electrical signal.

References Cited

UNITED STATES PATENTS

| | | | |
|---|---|---|---|
| 2,820,361 | 1/1958 | Apps. | |
| 2,884,624 | 4/1959 | Dean et al. | 73—40.5 X |
| 2,940,302 | 6/1960 | Scherbatskoy | 73—40.5 |
| 2,951,366 | 9/1960 | Mark et al. | 73—69 X |
| 3,016,457 | 1/1962 | Brown et al. | 73—69 X |
| 3,085,428 | 4/1963 | Waddill | 73—69 X |
| 3,192,516 | 6/1965 | Simpkins et al. | 73—40.5 X |
| 3,222,635 | 12/1965 | Simpkins et al. | |
| 3,224,252 | 12/1965 | Hamilton | 73—49.2 |

DONALD O. WOODIEL, Primary Examiner